United States Patent
Parker et al.

(10) Patent No.: US 8,861,740 B2
(45) Date of Patent: Oct. 14, 2014

(54) AUTOMATIC COMPUTER AUDIO INPUT AND OUTPUT CONTROL

(75) Inventors: Joseph R. Parker, Hillsborough, NC (US); Paul D. Plaskonos, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 2222 days.

(21) Appl. No.: 11/648,228

(22) Filed: Dec. 29, 2006

(65) Prior Publication Data
US 2008/0159561 A1    Jul. 3, 2008

(51) Int. Cl.
*H04R 29/00* (2006.01)
*H04R 3/00* (2006.01)
*G06F 9/44* (2006.01)

(52) U.S. Cl.
CPC ............... *G06F 9/4418* (2013.01)
USPC ............... 381/58; 381/113; 381/122

(58) Field of Classification Search
USPC ............ 381/104, 107, 58, 59, 74, 77, 79, 91, 381/111, 113, 122; 455/569.1, 569.2
See application file for complete search history.

(56) References Cited

U.S. PATENT DOCUMENTS

| | | | |
|---|---|---|---|
| 5,740,453 A * | 4/1998 | Lada, Jr. | 713/330 |
| 5,754,874 A | 5/1998 | Watanabe et al. | G06F 13/00 |
| 5,794,163 A * | 8/1998 | Paterson et al. | 455/575.2 |
| 5,832,438 A * | 11/1998 | Bauer | 704/270 |
| 5,910,991 A * | 6/1999 | Farrar | 381/59 |
| 6,321,278 B1 * | 11/2001 | Phu et al. | 710/14 |
| 2002/0039426 A1 * | 4/2002 | Takemoto et al. | 381/104 |

FOREIGN PATENT DOCUMENTS

| | | |
|---|---|---|
| CN | 1773846 A | 5/2006 |
| JP | S57-066512 | 4/1982 |
| JP | 02-185196 | 7/1990 |
| JP | 06-133387 | 5/1994 |
| JP | 2002-010389 | 1/2002 |
| JP | 2002-058092 | 2/2002 |
| JP | 2003-131698 | 5/2003 |
| JP | 2004-312637 | 11/2004 |
| JP | 2004-347998 | 12/2004 |
| JP | 2006-115192 | 4/2006 |

* cited by examiner

*Primary Examiner* — Xu Mei
(74) *Attorney, Agent, or Firm* — Ference & Associates LLC

(57) ABSTRACT

An automatic arrangement for deactivating a computer's speaker or microphone immediately upon the unplugging of an external headphone, speaker or microphone from the computer. Similar principles can be employed in other contexts where there is a desire to afford different types or levels of audio output to different parties or in different settings.

13 Claims, 1 Drawing Sheet

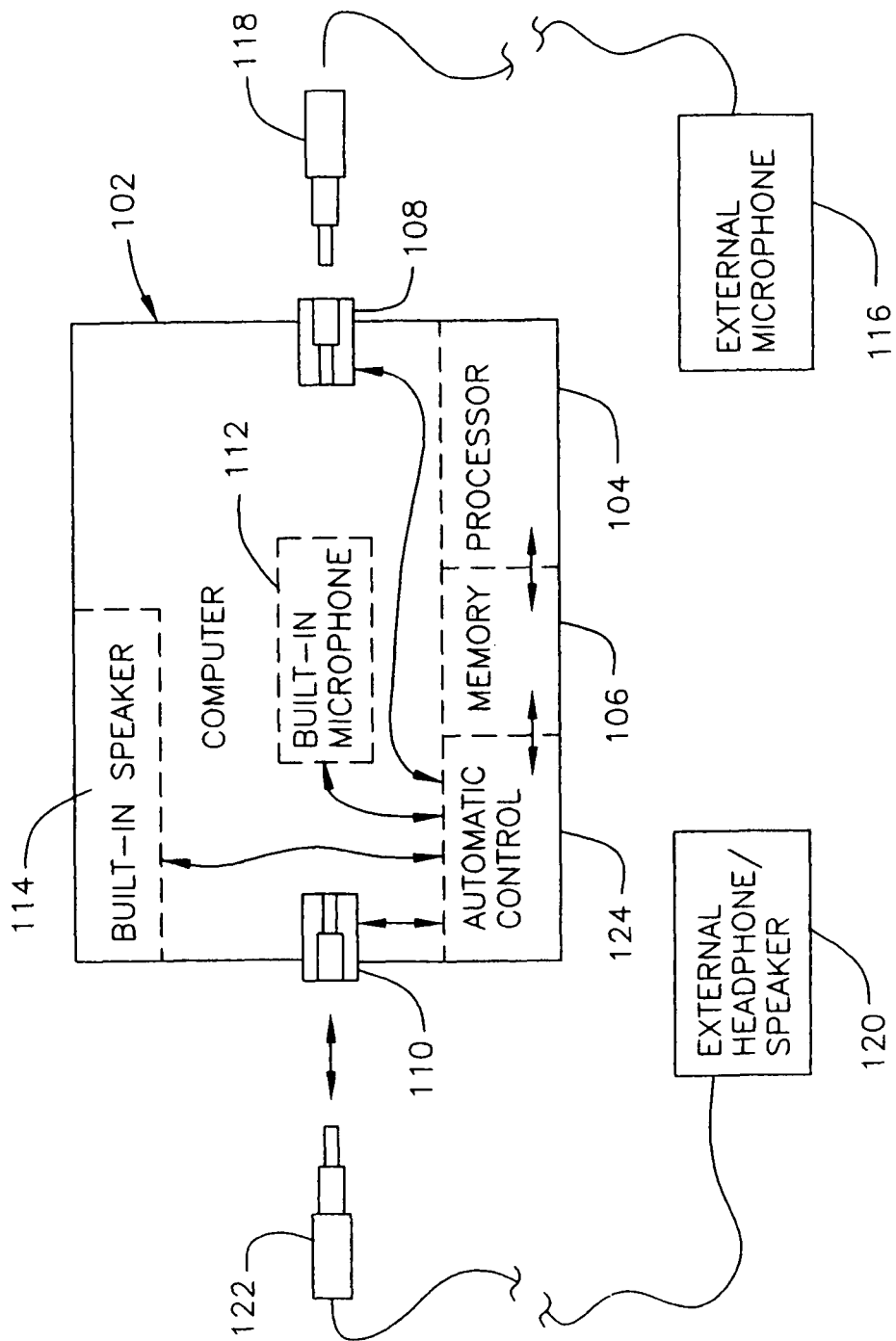

AUTOMATIC COMPUTER AUDIO INPUT AND OUTPUT CONTROL

FIELD OF THE INVENTION

The present invention relates to audio control on desktop computers and laptops, and particularly in connection with the plugging and unplugging of headphones, microphones or analogous equipment.

BACKGROUND OF THE INVENTION

In the context of desktop or laptop computers, headphones have long provided the user not only with a useful practical tool for listening to audio media through the computer without disturbing others, but have afforded a desirable "cocoon" effect that permits the user to engage in pleasurable listening until such a time that the headphones must be unplugged and other business needs to be addressed. Often, headphone reception of the audio content needs to give way to transmission of such content through the computer's built-in speakers, or regrettably the user must move to another task altogether.

Often, an unpleasant surprise is encountered when the user chooses to put the computer in suspend mode. If the headphones have been removed and nothing more has been done to mute or attenuate the audio content, then a sudden blast of noise may burst out of the computer as soon as it comes out of suspend mode, thus causing great discomfort or embarrassment to the user or others around him or her. Of course, muting or attenuating the sound ahead of time would avert such a situation, but this is often seen as an undesirable extra step.

Similar problems are often encountered with computer microphones. Whereas computers often have built-in microphones, external ones can be plugged into a jack on the computer. If the latter is the case, then it will often happen that, again, upon unplugging the external microphone and putting the computer in suspend mode, the computer's built-in microphone will quickly activate at some time later as soon as the computer comes out of suspend mode. This can cause undesirable problems such as feedback or the unintentional and unauthorized recording of individuals. Again, the problem can be averted ahead of time by consciously deactivating the computer's built-in microphone before going into suspend, but this is also an undesirable extra step.

Accordingly, a need has been recognized in connection with averting the problems and annoyances discussed hereabove, in a way to provide a user with some reassurance that built-in speakers or microphones can easily be deactivated, in connection with the unplugging of an external headphone arrangement or microphone, without much effort.

SUMMARY OF THE INVENTION

Broadly contemplated herein, in accordance with at least one presently preferred embodiment of the present invention, is an automatic arrangement for deactivating a computer's built-in speaker or microphone immediately upon the unplugging of an external headphone, speaker or microphone from the computer. Similar principles can be employed in other contexts where there is a desire to afford different types or levels of audio output to different parties or in different settings.

In summary, one aspect of the invention provides a system comprising: a processor; at least one of an audio input element and an audio output element in communication with said processor; a module which acts to control said at least one of an audio input element and an audio output element; a memory storing code accessible by said processor to prompt said module to automatically alter a condition of said at least one of an audio input element and an audio output element responsive to a change in an external condition, the change in an external condition including at least one of: a change in an ambient or operational condition; and a connect or disconnect with respect to at least one external element.

Another aspect of the invention provides a method comprising: providing at least one of a audio input element and a output element at a computer; and automatically altering a condition of the at least one of a audio input element and a audio output element responsive to a change in an external condition, the change in an external condition including at least one of: a change in an ambient or operational condition; and a connect or disconnect with respect to at least one external element.

Furthermore, an additional aspect of the invention provides a program storage device readable by machine, tangibly embodying a program of instructions executable by the machine to perform acts, said acts comprising: providing at least one of a audio input element and a audio output element at a computer; and automatically altering a condition of the at least one of a audio input element and a audio output element responsive to a change in an external condition, the change in an external condition including at least one of: a change in an ambient or operational condition; and a connect or disconnect with respect to at least one external element.

BRIEF DESCRIPTION OF THE DRAWINGS

FIG. 1 schematically depicts a computer with an arrangement for automatically controlling audio output.

DESCRIPTION OF THE PREFERRED EMBODIMENTS

For a better understanding of the present invention, together with other and further features and advantages thereof, reference is made to the following description, taken in conjunction with the accompanying drawings, and the scope of the invention will be pointed out in the appended claims.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in FIG. 1, is not intended to limit the scope of the invention, as claimed, but is merely representative of selected embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals or other labels throughout. The following description is intended only by way of example, and simply illustrates certain selected embodiments of devices, systems, and processes that are consistent with the invention as claimed herein.

Certain presently preferred embodiments of the invention are now described with reference to the Figures, where like reference numbers indicate identical or functionally similar elements. The components of the present invention, as generally described and illustrated in the Figures, may be implemented in a variety of configurations. Thus, the following more detailed description of the embodiments of the system and method of the present invention, as represented in the Figures, is not intended to limit the scope of the invention, as claimed, but is merely representative of presently preferred embodiments of the invention.

Throughout the following description, various system components are referred to as "modules" or the like. In certain embodiments, these components may be implemented as software, hardware, firmware, or any combination thereof.

For example, as used herein, a module may include any type of computer instruction or computer executable code located within a memory device and/or transmitted as electronic signals over a system bus or network. An identified module may include, for instance, one or more physical or logical blocks of computer instructions, which may be embodied within one or more objects, procedures, functions, or the like.

The identified modules need not be located physically together, but may include disparate instructions stored at different memory locations, which together implement the described logical functionality of the module. Indeed, a module may include a single instruction, or many instructions, and may even be distributed among several discrete code segments, within different programs, and across several memory devices.

In accordance with a preferred embodiment of the present invention, as shown in FIG. 1, a computer (such as a desktop or laptop) 102 will include a processor 104 and memory 106 in known manner. Jacks 108 and 110 may be provided, respectively, for receiving plugs 118, 122 corresponding, respectively to an external microphone device 116 and external headphone or speaker set 120. Typically, computer 102 will also include its own built-in microphone and speaker (112 and 114, respectively). In accordance with a preferred embodiment of the present invention, and in a manner to be described and appreciated more fully below, a module or arrangement 124 may be configured for automatically regulating the input or output at a built-in microphone and/or speaker 112/114 in response to connection or disconnection of a plug 118/122 with respect to an jack 108/110. Preferably, upon disconnection of a plug 118/122 with from a corresponding jack 108/110, the audio input or output at built-in microphone 112 or speaker 114 will be altered.

In accordance with a particularly preferred embodiment of the present invention, audio output at a built-in speaker 114 will be attenuated or blocked upon disconnection of an external headphone or speaker plug 122 from jack 110. This would be particularly advantageous in a situation commonly encountered with laptops, where a laptop might be in a "suspend" mode after a user has, e.g., listened to music through an external headphone 120 and plug 122 is removed from jack 110. Normally, when the laptop comes out of "suspend" mode, the audio output (e.g., music) will suddenly issue forth from built-in speaker 114. However, in accordance with an embodiment of the present invention, module or arrangement 124 will be configured such that audio output from speaker 114 will have been blocked immediately upon removal of plug 122 from jack 110. This stands in stark contrast to conventional arrangements where, e.g., a user would normally have to hit a "mute" button on a laptop or at least hit a volume control several times to greatly reduce the volume level associated with speaker 114.

Similar principles may preferably apply to a built-in microphone 112 and external microphone 116. In that scenario, when an external microphone 116, is disconnected from computer 102 via a severance of the connection between plug 118 and jack 108, built-in microphone 112 itself will be deactivated so as not to, e.g., produce any unwanted feedback or inadvertently receive audio input from outside of the computer 102 when such is not desired. Again, module or arrangement 124 will preferably be configured so as to effect such deactivation immediately upon disconnection of plug 118 from jack 108.

There are numerous applications for the principles broadly addressed hereinabove, including numerous possible variations on the basic themes discussed. The common thread, in each case, is the automatic regulation or management of audio input or output in a computer on the basis of a changed parameter or condition. For instance, a detected user profile could govern the types of audio output that are admitted out of either built-in speaker 114 or audio output 110, or both. In this vein, certain types of audio output could be blocked for all but a number of pre-authorized adults in order to prevent such output from reaching children. Localization may also come into play in that in some countries there might be greater government regulation with regard to the intensity or level of audio output that may issue out of a built-in speaker or external speaker or headphone.

In connection with the above, a computer 102 could contain various profiles related to preferences or desired standards regarding a user or location. For instance, there could be a different profile for each user, and (in general or as a subset of profiles for each user) for different environments or settings (e.g., one profile or sub-profile corresponding to the use of headphones are used on a laptop in the office, another corresponding to the use of headphones are used with a laptop at home, yet another for the use of headphones with a laptop on a manufacturing floor, etc.). Thus, prospective ambient noise levels in different locations could be taken into account. A program could control the associated settings and could be dependent upon, e.g., GPS readings or even ambient noise readings as input.

Generally, the specific manner by which a module or arrangement (124) controls audio input or output can take on essentially any conceivable form. Such automatic control may be inherent to the sound card or device driver already present in the computer (102) or could be supplied via any conceivable form of retrofit (e.g., via downloading an update from a company website).

Additional embodiments of the present invention, over and above those discussed and contemplated hereinabove, are of course conceivable. With the advent of protocols transmitting voice over the internet, many computer users are making use of headsets which provide stereo headphones and a microphone in combination. Thus, the volume level and microphone level preferred by the user when using such an ensemble may be completely different than the levels preferred when the headset is unplugged. In accordance with a variant embodiment of the present invention, suitable levels for both volume and microphone input can be set simultaneously, and automatically, via plugging in or unplugging the headset, in a manner consistent with other embodiments discussed and contemplated hereinabove.

It should be clearly appreciated that the concepts discussed and broadly contemplated and embraced herein and in the drawing figure are applicable to a wide range of computers and computer operating environments. Accordingly, the embodiments of the present invention may be implemented, inter alia, in laptop or desktop computers or essentially in any machine or device which includes a sound card.

It is to be understood that the present invention, in accordance with at least one presently preferred embodiment, includes elements that may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A system for automatic audio control, comprising:
   a processor;
   a built in microphone in communication with said processor;
   a module which acts to control said built in microphone; and
   a memory storing code accessible by said processor to prompt said module to automatically deactivate said built in microphone responsive to a disconnect with respect to one or more external audio input element.

2. The system according to claim 1, further comprising one or more jacks for accommodating an external audio output element.

3. The system according to claim 2, wherein said one or more jacks comprises a one or more jacks for accommodating an external audio input element.

4. The system according to claim 1, wherein said code acts to prompt said module to alter a condition of said built in microphone responsive to a change in an ambient or operational condition.

5. The system according to claim 4, wherein said code acts to prompt said module to alter a condition of said built in microphone according to at least one of: a user profile and a system location.

6. The system according to claim 1, wherein said memory storing code accessible by said processor further prompts said module to automatically regulate an audio input from said built in microphone responsive to detection of a user profile.

7. The system according to claim 1, wherein to automatically deactivate comprises automatically deactivating said built in microphone responsive to a disconnect of at least one external audio input element.

8. A method for automatic audio control, comprising:
   enabling a built in microphone in a computer; and
   automatically deactivating said built in microphone responsive to a disconnect with respect to at least one external audio input element.

9. The method according to claim 8, further comprising altering a condition of said built in microphone according to at least one of: a user profile and a computer location.

10. The method according to claim 8, further comprising: automatically regulating audio input from said built in microphone responsive to detection of a user profile.

11. The method according to claim 8, wherein said automatically deactivating comprises automatically deactivating said built in microphone responsive to a disconnect of at least one external audio input element.

12. A program storage device readable by machine, tangibly embodying a program of instructions executable by the machine to perform acts of automatic audio control, said acts comprising:
   enabling a built in microphone in a computer; and
   automatically deactivating said built in microphone responsive to a disconnect with respect to at least one external audio input element.

13. The program storage device according to claim 12, wherein said automatically deactivating comprises automatically deactivating said built in microphone responsive to a disconnect of at least one external audio input element.

* * * * *